(12) United States Patent
Bulat et al.

(10) Patent No.: US 11,365,689 B2
(45) Date of Patent: Jun. 21, 2022

(54) METHOD OF CONTROLLING A GAS TURBINE ENGINE

(71) Applicant: Siemens Energy Global GmbH & Co. KG, Munich (DE)

(72) Inventors: Diana Bulat, Lincoln (GB); Dorian Skipper, Lincoln (GB); Michael Smith, North Hykeham (GB)

(73) Assignee: SIEMENS ENERGY GLOBAL GMBH & CO. KG, Munich (DE)

(*) Notice: Subject to any disclaimer, the term of this patent is extended or adjusted under 35 U.S.C. 154(b) by 78 days.

(21) Appl. No.: 16/753,831

(22) PCT Filed: Oct. 23, 2018

(86) PCT No.: PCT/EP2018/078977
§ 371 (c)(1),
(2) Date: Apr. 6, 2020

(87) PCT Pub. No.: WO2019/086294
PCT Pub. Date: May 9, 2019

(65) Prior Publication Data
US 2020/0362767 A1    Nov. 19, 2020

(30) Foreign Application Priority Data
Oct. 30, 2017  (EP) .................................. 17199213

(51) Int. Cl.
*F02C 9/28* (2006.01)
*F02C 9/18* (2006.01)

(52) U.S. Cl.
CPC .................. *F02C 9/18* (2013.01); *F02C 9/28* (2013.01); *F05D 2270/053* (2013.01); *F05D 2270/082* (2013.01); *F05D 2270/303* (2013.01)

(58) Field of Classification Search
CPC ...... F02C 9/28; F02C 9/20; F02C 9/18; F02C 6/08; F02C 7/18; F05D 2270/303
See application file for complete search history.

(56) References Cited

U.S. PATENT DOCUMENTS

| 8,015,826 | B2 * | 9/2011 | Myers | .................... F02C 9/18 60/785 |
| 9,297,316 | B2 | 3/2016 | Scipio et al. | |

(Continued)

FOREIGN PATENT DOCUMENTS

RU    2608533 C2    1/2017

OTHER PUBLICATIONS

International search report and written opinion dated Jan. 21, 2019 for corresponding PCT/EP2018/078977.

*Primary Examiner* — Katheryn A Malatek

(57) ABSTRACT

A method of controlling a gas turbine engine capable of operating in at least a high output power range, a medium-high output power range, a medium-low output power range and a low output power range. The method includes during the medium-high output power range bleeding a gas from a downstream part of the compressor to an upstream part of the compressor so that a first predetermined temperature of the combustor is maintained, during the medium-low output power range bleeding a gas from a downstream part of the compressor to an upstream part of the compressor and bleeding a gas from the downstream part of the compressor to the exhaust so that a second predetermined temperature of the combustor is maintained.

20 Claims, 3 Drawing Sheets

(56) References Cited

U.S. PATENT DOCUMENTS

| | | |
|---|---|---|
| 9,624,830 B2 | 4/2017 | Ferreira-Providakis et al. |
| 2005/0235649 A1 | 10/2005 | Baer et al. |
| 2009/0053036 A1 | 2/2009 | Crawley et al. |
| 2017/0058770 A1 | 3/2017 | Vandale et al. |

\* cited by examiner

METHOD OF CONTROLLING A GAS TURBINE ENGINE

CROSS REFERENCE TO RELATED APPLICATIONS

This application is the US National Stage of International Application No. PCT/EP2018/078977 filed 23 Oct. 2018, and claims the benefit thereof. The International Application claims the benefit of European Application No. EP17199213 filed 30 Oct. 2017. All of the applications are incorporated by reference herein in their entirety.

FIELD OF THE INVENTION

The present invention relates to a method of controlling a gas turbine and a gas turbine engine and in particular but not exclusively a method of controlling a gas turbine comprising operating compressor bleeds to maintain more constant combustion temperature, for reduced emissions, at different demanded loads and a gas turbine engine having a number of bleed systems.

BACKGROUND

For a twin or two shaft gas turbine, where there can be a separate gas generator unit and a free-power turbine driving a load, emissions at low power ranges and on lean burn combustion systems are controlled by restricting the air or mass flow through the combustor in order to maintain an acceptable fuel/air ratio and hence high combustion temperature. A high and stable combustion temperature leads to lower emissions such as COX, NOX, SOX as well as unburned hydrocarbons. Previously the use of bleed from the compressor delivery to an exhaust of the gas turbine has been sufficient for legislated ranges of operating loads but this carries a penalty in terms of lower thermal efficiency. Modern trends require cleaner combustion when the gas turbine is operating down to lower percentages of the full load power, e.g. as low as 30% full load power in certain circumstances and with less penalty on thermal efficiency and hence reduced fuel consumption.

SUMMARY OF INVENTION

The present invention seeks to solve the problem of reducing emissions of gas turbine engines and particularly when operating across the full range of operating power outputs. Another problem solved by the present invention is to maintain constant temperatures of the combustor so that emissions are minimised. Another problem being solved is to improve combustion stability and therefore improve operability of the gas turbine engine. Another problem being solved is to reduce or minimise the impact on the thermal efficiency of the gas turbine and particularly at less than high power outputs.

Therefore there is provided a method of controlling a gas turbine engine, the gas turbine engine having in axial flow series a compressor, a combustor, a compressor-turbine and an exhaust. The gas turbine capable of operating in at least a high output power range, a medium-high output power range, a medium-low output power range and a low output power range. The method comprising the steps during the medium-high output power range bleeding a gas from a downstream part of the compressor to an upstream part of the compressor so that a first predetermined temperature of the combustor is maintained, during the medium-low output power range bleeding a gas from a downstream part of the compressor to an upstream part of the compressor and bleeding a gas from the downstream part of the compressor to the exhaust so that a second predetermined temperature of the combustor is maintained.

The output power ranges may be relative to one another such that in descending order of power outputs the ranges are: high output power range, medium-high output power range, medium-low output power range and low output power range. Thus for any one gas turbine engine the output power ranges do not overlap or may be sequential.

During the low output power range bleeding a gas from a downstream part of the compressor to an upstream part of the compressor may be at a maximum and bleeding a gas from the downstream part of the compressor to the exhaust may be at a maximum.

During the high output power range bleeding a gas from a downstream part of the compressor to an upstream part of the compressor may be at a minimum or zero and bleeding a gas from the downstream part of the compressor to the exhaust may be at a minimum or zero.

During the medium-low output power range bleeding a gas from a downstream part of the compressor to an upstream part of the compressor may be at a maximum.

The medium-high output power range has a maximum point and a minimum point and bleeding the gas from the downstream part of the compressor to the upstream part of the compressor may comprise changing the amount of gas bled from a minimum amount at the maximum point to a maximum amount at the minimum point.

The medium-low output power range has a maximum point and a minimum point and bleeding a gas from the downstream part of the compressor to the exhaust may comprise changing the amount of gas bled from a minimum amount at the maximum point to a maximum amount at the minimum point.

Each of the first and second predetermined temperatures may comprise a nominal temperature and upper and lower limits, advantageously the upper and lower limits having variances from the nominal temperature of +5° C. and −5° C. respectively. Changing the amount of gas bled may comprise increasing the amount of gas bled if the temperature of the combustor reaches the lower limit and/or decreasing the amount of gas bled if the temperature of the combustor reaches the upper limit.

The difference between the first predetermined temperature and the second predetermined temperature may be in the range 5-20° C. and more advantageously approximately 10° C.

The method may comprise detecting bleeding the gas from a downstream part of the compressor to an upstream part of the compressor has reached a maximum and starting bleeding a gas from the downstream part of the compressor to the exhaust. Alternatively, the method may comprise detecting bleeding the gas from a downstream part of the compressor to an upstream part of the compressor has reached a predetermined point which is above 90% maximum, or more advantageously, above 95% maximum, and starting bleeding a gas from the downstream part of the compressor to the exhaust.

The high output power range may be between 100% to 50% maximum output power, advantageously the high output power range may be between 100% to 75% maximum output power.

The medium-high output power range may be between 85% to 40% maximum output power, advantageously the medium-high output power range may be between 75% to 50% maximum output power.

The medium-low output power range may be between 85% to 30% maximum output power, advantageously the medium-low output power range may be between 60% to 30% maximum output power, more advantageously the medium-low output power range may be between 50% to 35% maximum output power.

The low output power range may be between 0% and 60% maximum output power, advantageously in a low output power range may be between 0% and 40% maximum output power, and more advantageously the low output power range may be between 0% and 30%.

In another aspect of the present invention there provided a gas turbine engine capable of operating in at least a high output power range, a medium-high output power range, a medium-low output power range and a low output power range. The gas turbine engine comprising in axial flow series a compressor, a combustor, a compressor-turbine and an exhaust, a temperature sensor mounted to the gas turbine engine and arranged to sense or calculate the temperature of the combustor. The engine has a first compressor bleed system comprising a first duct connecting a downstream part of the compressor and an upstream part and a first valve located on the duct. The engine has a second compressor bleed system comprises a second duct connecting the downstream part of the compressor and the exhaust and a second valve located on the duct. The engine also comprises an engine control unit connected to the temperature sensor, the first valve and the second valve, the engine control unit programmed to control the first valve and the second valve dependent on the temperature of the combustor such that during the medium-high output power range the first valve is at least partly open such that a first predetermined temperature of the combustor is maintained and during the medium-low output power range the second valve is at least partly open and the first valve is fully open such that a second predetermined temperature of the combustor is maintained.

The gas turbine engine further may comprise a power turbine located between the turbine and the exhaust, the power turbine is connected to a shaft for driving a load.

The upstream part is an inlet of the compressor or an inlet of the gas turbine engine and the downstream part is at least the outlet of the compressor. The first compressor bleed system and the second compressor bleed system have a common first bleed outlet or a common array of first bleed outlets located at the outlet of the compressor.

The first compressor bleed system and the second compressor bleed system have a common second bleed outlet or a common array of first bleed outlets located between the inlet and outlet of the compressor.

BRIEF DESCRIPTION OF THE DRAWINGS

The above mentioned attributes and other features and advantages of this invention and the manner of attaining them will become more apparent and the invention itself will be better understood by reference to the following description of embodiments of the invention taken in conjunction with the accompanying drawings, wherein.

DETAILED DESCRIPTION OF INVENTION

Figure 1:
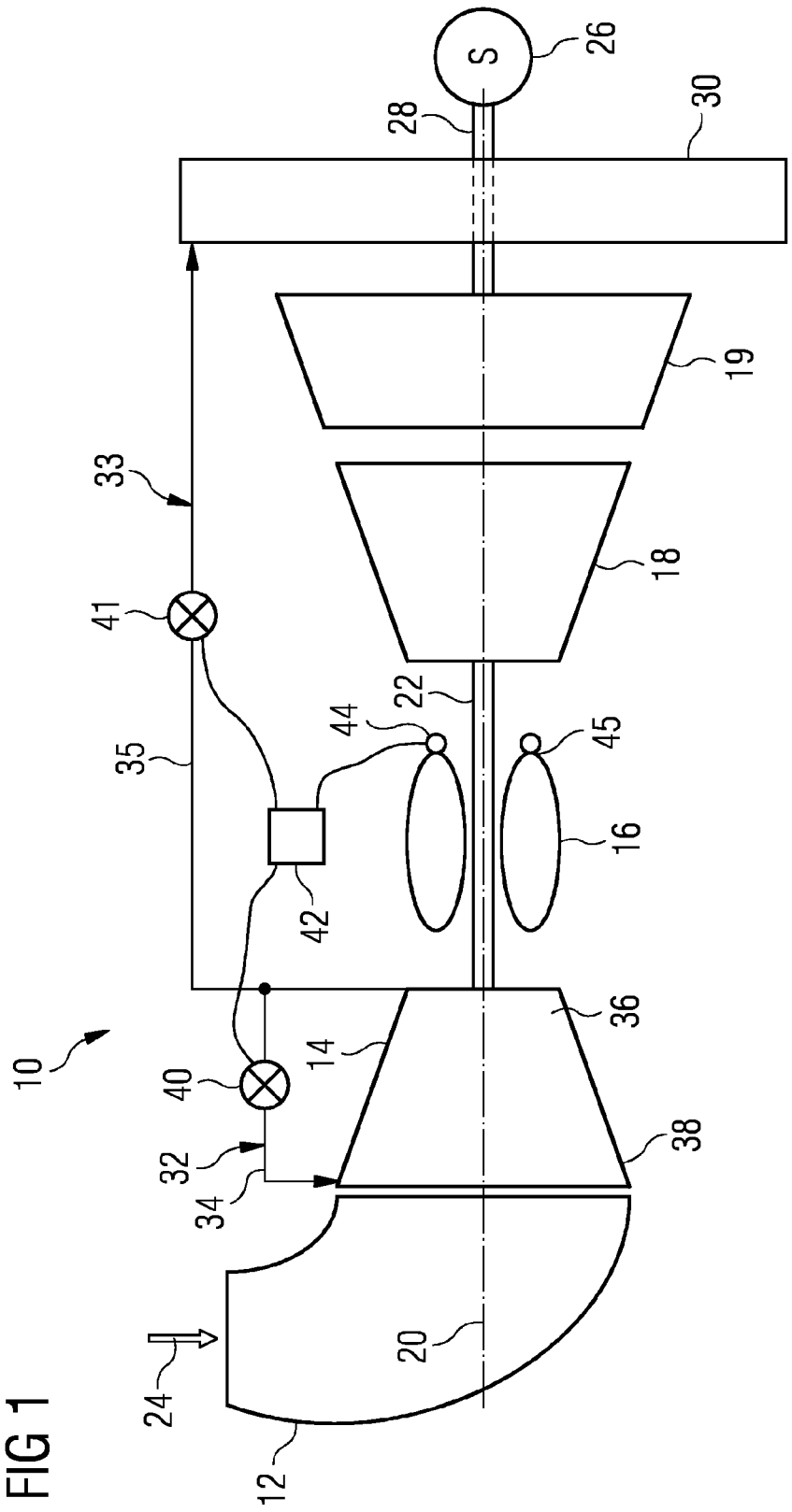
FIG. 1 is a schematic layout of a gas turbine engine in accordance with the present invention and showing a compressor to exhaust bleed system and a compressor-recirculation bleed system.

FIG. 1 shows an example of a gas turbine engine 10 in a sectional view. The gas turbine engine 10 comprises, in flow series, an inlet 12, a compressor 14, a combustor 16 and a turbine 18 which are generally arranged in flow series and generally about and in the direction of a longitudinal or rotational axis 20. The gas turbine engine 10 further comprises a first shaft 22 which is rotatable about the rotational axis 20 and which extends longitudinally through part of the gas turbine engine 10. The first shaft 22 drivingly connects the turbine 18 to the compressor 14. The turbine 18 is sometimes known as the compressor-turbine or high-pressure turbine. A power turbine 19 may be located downstream of the compressor-turbine 18. The power turbine 19 may be drivingly connected to a load 26 via a second shaft 28. Alternatively the compressor turbine 18 may be drivingly connected to the load 26 via a shaft. An exhaust 30 is located downstream of the compressor-turbine 18 and downstream of the power turbine 19.

In operation of the gas turbine engine 10, air 24, which is taken in through the air inlet 12 is compressed by the compressor section 14 and delivered to the combustor 16. The combustor 16 comprises an annular array of combustor chambers as is well known, alternatively the combustor 16 can be a n annular combustor 16 having an otherwise generally conventional arrangement. The compressed air passing through the compressor 14 enters a diffuser and is discharged from the diffuser into the combustor 16 from where a portion of the air is mixed with a gaseous or liquid fuel. The air/fuel mixture is then burned and the combustion gas or working gas from the combustion is channelled through the combustion chamber 16 to the turbine 18 via a transition duct.

The combustion gas from the combustor 16 enters the turbine 18 and drives its turbine blades which in turn rotate the shaft 22 to drive the compressor 14. The turbine 18 may also drive the load 26 directly via a shaft. Although as shown in FIG. 1 the combustion gas or working gas passes from the turbine 18 into and through the power turbine 19. The power turbine 19 then may drive the load 26 via shaft 28. Working gas from either the power turbine 19 or compressor-turbine 18 passes into the exhaust 30 and then out to ambient.

The gas turbine engine 10 further comprises two compressor bleed systems. A first compressor bleed system 32 comprises a first duct 34 connecting a downstream part 36 of the compressor 14 and an upstream part 38. The upstream part 38 may be part of the compressor 14 or the inlet 12. As will be apparent to the skilled person the downstream part 36 of the compressor is usually at a higher pressure than the upstream part 38. A first valve 40 is located on the duct 34 and is operable to control the amount of compressor air bled from the downstream part and reinjected into the upstream part 38. In one embodiment the downstream part 36 is the outlet 56 of the compressor 14 or just downstream of the final stage of the compressor 14. The upstream part 38 is an inlet 55 of the compressor 14, but in other examples the upstream part 38 may be anywhere upstream of the bleed off-take or where the first duct 34 connects to the downstream part 36 of the compressor 14.

A second compressor bleed system 33 comprises a second duct 35 connecting the downstream part 36 of the compressor 14 and the exhaust 30. As will be apparent to the skilled person the downstream part 36 of the compressor is at a higher pressure than the exhaust 30. A second valve 41 is located on the duct 35 and is operable to control the amount of compressor air bled from the downstream part 36 and injected into the exhaust 30.

The gas turbine engine 10 also comprises an engine control unit 42. The gas turbine engine 10 further comprises a temperature sensor 44 arranged to measure or to calculate a value representing the temperature of the combustion gas at an outlet 45 of the combustor 16. There may be one temperature sensor 44 or an annular array of temperature sensors 44 either mounted to each combustor unit in an array of combustor units or around an annular combustor, or the sensors 44 may be downstream from the combustor outlet 45 and the temperature at the outlet 45 is calculated within the control unit 42 from these downstream measurements. Among other aspects of the gas turbine engine, the engine control unit 42 is connected to the first valve 40 of the first compressor bleed system 32, second valve 41 of the second compressor bleed system 33 and the temperature sensor(s) 44. The engine control unit 42 is programmed with a set of instructions for operating the valves 40, 41 during engine operation.

In general, restricting the air flow through the combustor 16 maintains an acceptable fuel/air ratio and hence high combustion temperature. Restricting the air flow through the combustor 16 is achieved by reducing the pressure ratio across the compressor 14 and therefore the amount of compressed air fed into the combustor 16. The present method bleeds compressed air first via control of the first bleed system 32 and then via the second bleed system 33. This method provides progressive and sequential management of reducing the pressure ratio across the compressor. This method is applicable in both directions of power output or load i.e. decreasing power output and increasing power output. In other words when increasing or decreasing output power the first bleed system 32 is used to its fullest extent and then the second bleed system 33 is used. The first bleed system 32, bleeding from the downstream part to the upstream part of the compressor is the more efficient bleed system because it has less impact on the thermal efficiency of the engine. The first bleed system 32 effectively reduces the pressure of the compressor at its downstream part by bleeding compressed air and by injecting pressurized air into the upstream part increases its pressure thereby relatively efficiently reducing the pressure ratio across the compressor. The second bleed system is used after the first bleed system because it is less efficient in terms of thermal cycle of the engine as it dumps compressed air into the exhaust and loses much of the work done in compressing it in the first place.

Figure 2:
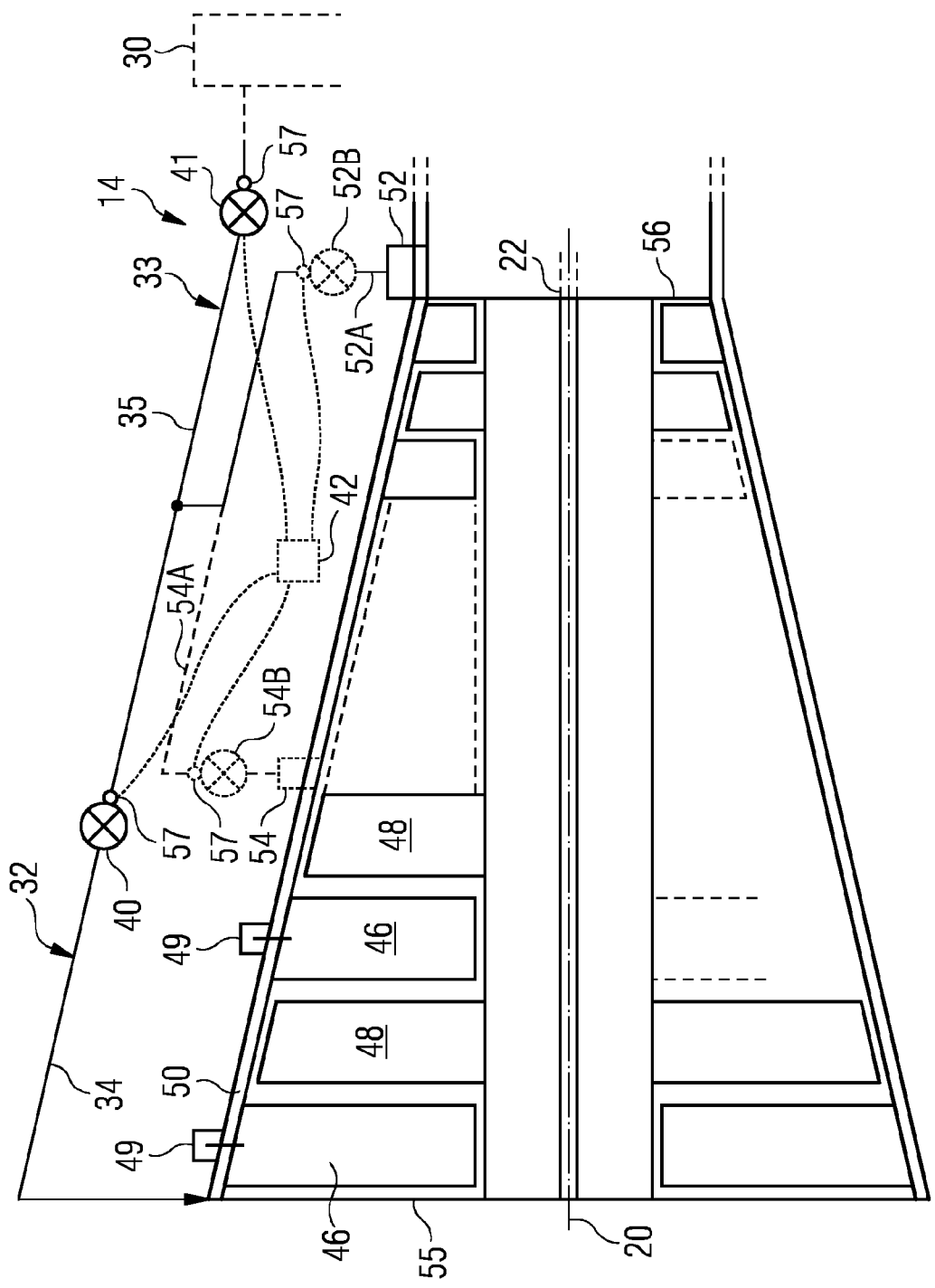
FIG. 2 is a schematic layout of the compressor of the gas turbine engine in accordance with the present invention and in an enlarged view.

Referring to FIG. 2, the compressor 14 comprises an axial series of vane stages 46 and rotor blade stages 48. The rotor blade stages 48 comprise a rotor disc supporting an annular array of blades in conventional fashion. The compressor 14 also comprises a casing 50 that surrounds the rotor stages and supports the vane stages 46. The guide vane stages include an annular array of radially extending vanes that are mounted to the casing 50. The vanes are provided to present gas flow at an optimal angle for the blades at a given engine operational point. Some of the guide vane stages may have variable vane mechanisms 49, where the angle of the vanes, about their own longitudinal axis, can be adjusted for angle according to air flow characteristics that can occur at a range of different engine operating conditions.

The compressor 14 further comprises bleed outlets 52, 54 mounted to the casing 50 and which allows compressed air to be bled from the compressor 14. Two bleed outlets are shown although one or at least 3 bleed outlets are possible. Each bleed outlet 52, 54 may be each an array of bleed outlets 52, 54 around the circumference of the casing and fluidly connected via a gallery or separate galleries. The gallery(s), not shown, extends in the circumferential direction partly or wholly surrounding the casing and connecting the bleed outlets. A bleed duct 52A, 54A leads from each bleed outlet 52, 54 respectively and each bleed duct 52A, 54A may have an operable valve 52B, 54B each connected to and controlled by the engine control unit 42. Bleed outlet 52 is advantageously located at or near to the outlet 56 of the compressor, but it can be located between stages of the compressor and downstream of the bleed outlet 54 when two bleed outlets or off-takes are employed. Where there is only one bleed outlet it is advantageously bleed outlet 52. The bleed ducts 52A and 54A connect to the first duct 34 and second duct 35. Alternatively, the bleed ducts 52A may connect to the second duct 35 and the bleed duct 54A may connect to the first duct 34.

The gas turbine engine 10 may comprise valve position sensors 57 on each of the first valve(s) 40 and second valve(s) 41 and indeed valves 52B, 54B. The valve position sensors 57 are connected to the engine control unit 42 so that it is known whether the valve is fully open or fully closed or a position between fully open and fully closed. Therefore, by calibrating the bleed system for air flow against valve position, the quantity of air being bled from the compressor is known at any desired time. Thus it is possible to match the valve position to the power output over the power output ranges 67R, 70R and 70R'.

Figure 3:
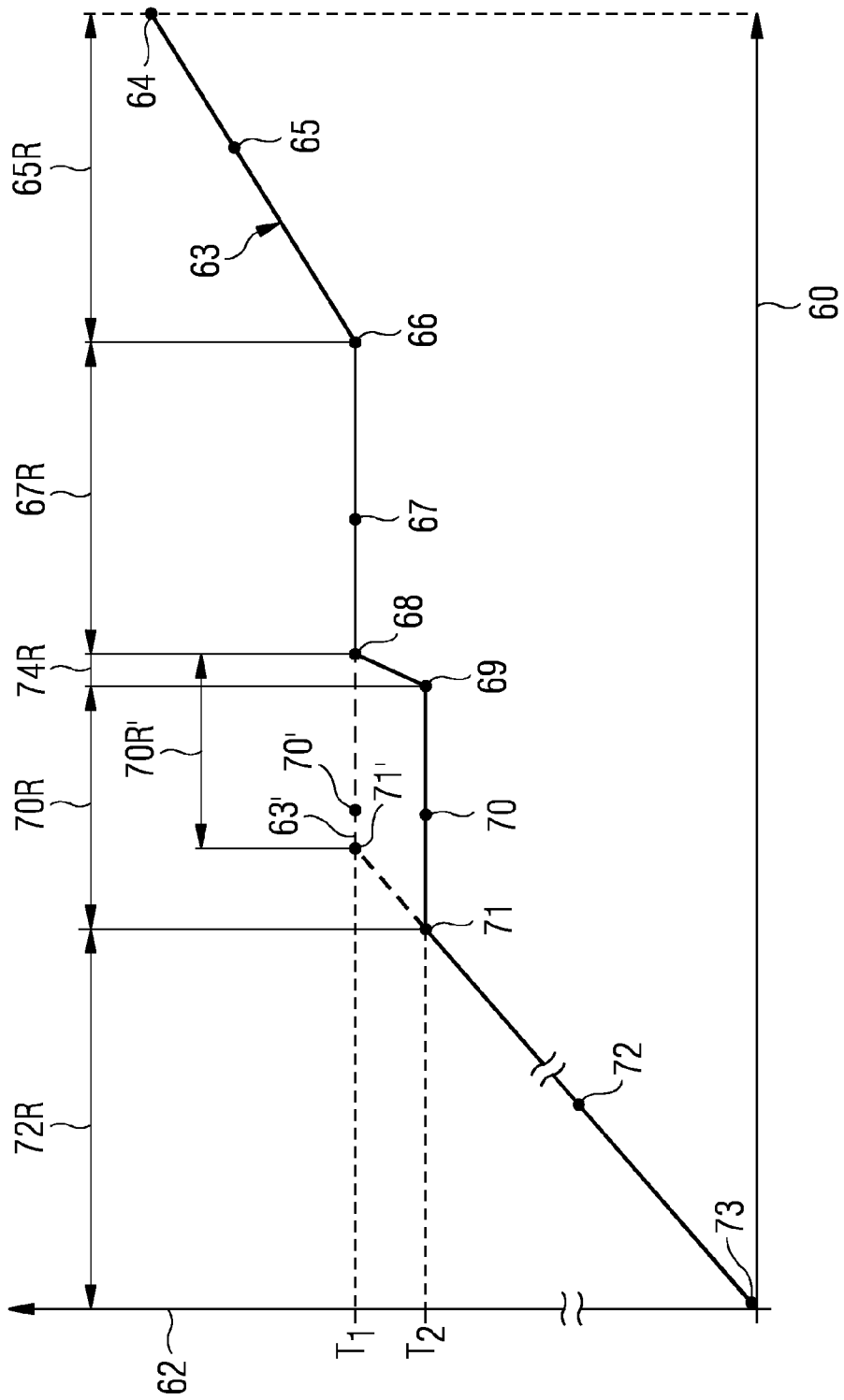
FIG. 3 is a graphical representation of the method of operating the gas turbine in accordance with the present invention, the graphical representation showing the general relationship between output power of the gas turbine engine along the x-axis and combustor temperature along the y-axis, in particular this graphical representation is for when the demanded load of the gas turbine engine is changed between a high output power and a low output power.

Referring now to FIG. 3, the x-axis scale 60 is the percentage output power relative to the maximum power attainable from the gas turbine engine at specific weather or ambient conditions at the inlet and particularly the inlet temperature and pressure. Alternatively, the x-axis scale could be engine output power with maximum power output (at point 64). The y-axis scale is temperature of the combustion gas at the outlet 45 of the combustor 16. Immediately, it is pointed out that for any given gas turbine engine and ambient conditions at the inlet 12 the temperature and percentage output power can be markedly different to those schematically shown and therefore the graphical representation is not to scale.

The method of operating the gas turbine engine is intended to follow the operating line 63 which depicts the relationship between percentage output power and temperature at the outlet 45 of the combustor 16 as previously mentioned above. The operating line 63 has a number of points 64 to 73 and operating conditions or ranges which will now be described with reference to reducing the power output of the gas turbine engine from 100% to 0% maximum output power i.e. from top right of the graph to bottom left. However, it should be appreciated that the present method does not require the gas turbine engine to be at 100% nor end at 0%. It should be apparent that the method described here may comprise operation of the gas turbine engine during an increase in power output and between 0% (inclusive) and 100% (inclusive) i.e. from bottom left of the graph to top right of the graph or in other words increasing the output power of the engine 10. Furthermore, the present method only requires that the gas turbine can operate within the specified power output ranges where the first bleed system and/or the second bleed system operate.

Point 64 is 100% or maximum output power and the highest combustor outlet 45 temperature. At this operational point there is no bleed from the compressor 14 and the temperature at the outlet 45 of the combustor 16 is sufficiently high that minimal or acceptable emissions are generated.

Point 65 is in a high output power range 65R and is below 100% output power and the temperature measured at the outlet 45 of the combustor 16 is below the highest combustor outlet temperature. Point 65 represents a position on the graph between a point 66 and the point 64 and is within the engine's high output power range 65R. The high output power range 65R includes 100% output power (point 64) and up to point 66. Typically, the high output power range 65R is 100% maximum output power to 75% maximum output power. In other examples, the high output power range 65R is 100% maximum output power to 50% maximum output power. At the high output power range 65R there is no bleed from the compressor 14 and the temperature at the outlet 45 of the combustor 16 is still sufficiently high that minimal or acceptable emissions are generated.

Point 66 is at a first predetermined temperature T1 and within a medium-high output power range 67R of the gas turbine engine 10. Immediately above point 66 is the lowest combustor outlet 45 temperature for minimal or acceptable emissions and there is no bleed from the compressor 14 and this operating mode in as described with reference to point 65 above. Below point 66 the temperature of the combustor's outlet might otherwise be below a temperature of the combustor where emissions would be undesirable or unacceptable. Within the medium-high output power range 67R, e.g. at point 67, which is less than the high output power range 65R, the combustor 16 has a constant outlet temperature. Here, as the first outlet temperature reaches the first predetermined temperature T1 the method comprises bleeding a gas from a downstream part 36 of the compressor 14 to an upstream part 38 of the compressor 14 so that the first outlet temperature is maintained. As the power output of the engine decreases from the point 66 and towards point 68 the engine control unit 42 commands the valve 40 (and where applicable valves 52B and/or 54B) to open and increase the amount of bleed to maintain the first outlet temperature at the first predetermined temperature T1.

Point 68 represents the end of the medium-high output power range 67R. At point 68 bleeding the gas from a downstream part 36 of the compressor 14 to an upstream part 38 of the compressor 14 has reached a maximum and the valve 40 is fully open. It should be appreciated that 'fully open' here may mean that the valve is open to its maximum allowable extent depending on other parameters and application. For example, there may be another reason to limit the maximum allowable extent or 'fully open' state such as duct size or an operating limit such as maximum allowed inlet temperature to the compressor. After point 68 and as the output power decreases the temperature measured at the outlet 45 of the combustor 16 begins to decrease. Thus the method of operating engine comprises detecting bleeding a gas from the downstream part 36 of the compressor 14 to the upstream part 38 of the compressor 14 has reached a maximum and starting bleeding a gas from the downstream part 36 of the compressor 14 to the exhaust 30. Although, the maximum bleed point is advantageous to use as a point at which bleed to the exhaust may start, it is also possible to detect when a predetermined point above 90% or more advantageously above 95% of the maximum is reached to then start bleeding to exhaust. This can ensure a smooth transition between bleeds can occur.

Point 69 is where the gas turbine engine 10 begins operating at a medium-low output power range 70R and where the combustor 16 attains a second predetermined temperature T2 and, which in this example, is lower than the first predetermined temperature T1. At point 69 the engine control unit 42 receives a signal from the temperature sensor 44 to say that the second predetermined temperature T2 has been reached and commands the valve 41 to begin opening and to bleed the gas from the downstream part 36 of the compressor 14 to the exhaust 30 so that the second outlet temperature is maintained at second predetermined temperature T2. At point 70, which is representative of a point within the medium-low output power range 70R, bleeding the gas from a downstream part 36 of the compressor 14 to an upstream part 38 of the compressor 14 continues at a maximum and bleeding the gas from the downstream part 36 of the compressor 14 to the exhaust 30 is also occurring. From point 69 and towards point 71 in the power output range 70R there is an increasing amount of bleeding the gas from the downstream part 36 of the compressor 14 to the exhaust 30. The engine control unit 42 commands the valve 41 to gradually open an increasing amount and in relation to the decreasing engine output power so as to maintain the temperature (T2) at the outlet 45 of the combustor 16. When the valve 41 is fully open to its maximum physical state or another limit is reached such as the maximum allowed exhaust temperature, at point 71, the maximum quantity of bleed gas is being bled from the compressor 14 to the exhaust 30. Thus in the medium-low output power range 70R there is maximum or at least a high quantity of bleed gas is being bled from the downstream part 36 to the upstream part 38 of the compressor 14 and a variable amount of bleed from the compressor 14 to the exhaust 30.

The medium-low output power range 70R extends between point 69 and point 71. At point 69 effectively there is zero bleeding of the gas from the downstream part 36 of the compressor 14 to the exhaust 30, but it as this point the valve 41 is about to be opened. At point 71 the bleeding of the gas from the downstream part 36 of the compressor 14 to the exhaust 30 is at a maximum.

In a low output power range 72R, which occurs between point 71 and point 73 which is 0% maximum output power, bleeding of the gas from the downstream part 36 of the compressor 14 to an upstream part 38 and to the exhaust 30 are both at a maximum. With no further bleed possible the temperature of the outlet 45 of the combustor continues to fall with decreasing power output. Depending on the type of engine and ambient conditions the temperature of the combustor will be such that undesirable emissions will be generated; however, below point 71 the engine is often being shut down and does not operate for significant amount of time.

Each of the first and second predetermined temperatures T1, T2 comprises a nominal temperature and upper and lower limits. The upper and lower limits have variances from the nominal temperature typically of +5° C. and −5° C. respectively; this could also be called a temperature band of 10° C. having a median which is the predetermined temperature. Other applications may have different temperature bands or limits. Changing the amount of gas bled from either the first bleed system 32 or the second bleed system 33 depending on the operating power output comprises increasing or holding constant the amount of gas bled, by modulating the valve, if the temperature of the combustor 16 reaches the lower limit and/or decreasing or holding constant the amount of gas bled, by modulating the valves, if the temperature of the combustor reaches the upper limit.

The difference between the first predetermined temperature T1 and the second predetermined temperature T2 is approximately 10° C. although in other examples of a gas turbine engine, which can have markedly different combustion systems, the difference between the first predetermined temperature T1 and the second predetermined temperature T2 may be in the range 5-20° C. However, as described above modulation of the valves 40, 41 (and 52B, 54B) to control bleed mass flow is based on the combustor temperature reaching upper and lower limits, thus the temperature difference between T1 and T2 should be outside the upper and lower limits.

In another example of the method of operating the gas turbine engine 10, rather than using a temperature difference, i.e. the difference in temperature from predetermined temperature T1 to predetermined temperature T2, to initiate opening the valve 41 for the bleed from compressor to exhaust, it is possible to use other indicators that bleeding a gas from a downstream part 36 of the compressor 14 to an upstream part 38 of the compressor 14 has reached its maximum. One such indicator is the valve position sensor(s) 57 on the valve 40 (and if used valves 52B, 54B) such that it is known when bleeding a gas from a downstream part 36 of the compressor 14 to an upstream part 38 of the compressor 14 has reached a predetermined amount or the maximum amount. Thus in FIG. 3 a modified method of operating the gas turbine engine is intended to follow the operating line 63' which depicts the relationship between percentage output power and temperature at the outlet 45 of the combustor 16 as previously mentioned above. The operating line 63' has a number of operating points 64 to 68, 70', 71', 72 and 73. Operating points 64 to 68, and 73 are as described before and will not be described again. Operating points 70', 71', effectively replace points 70, 71, and point 69 is obsolete. The medium-low output power range 70R now becomes the medium-low output power range 70R' and which extends between point 68 and point 71'. Thus first predetermined temperature T1 may equal or approximately equal second predetermined temperature T2. For any given gas turbine engine the medium-low output power range 70R is approximately the same extent as the medium-low output power range 70R'.

Alternatively or as well as, the valve position sensor(s) 57 on the valve 40 (and if used valves 52B, 54B) sends continuous signals to the engine control unit 42. The engine control unit 42 is programmed such that when a predetermined valve position is reached, it commands the valve 41 to begin opening. As output power or load is reduced in the medium-low output power range 70R' the engine control unit 42 commands the valve 41 to open in relatively increasing amounts thereby maintaining the outlet temperature of the combustor 16 at predetermined temperatures T1 and/or T2.

When starting the gas turbine engine (point 73), as an example, and increasing the power output to 100% (point 64), both bleed systems 32, 33 are fully open during the low output power range 72R. An alternative approach to starting the gas turbine engine is to have one or both bleed systems 32, 33 closed when starting and increasing the load until a specified point, within the low output power range 72R, is reached at which point both the first and second bleed systems 32, 33 are increased to their maximum quantities. When the second predetermined temperature T2 of the combustor 16 is reached the valve 41 of the second bleed system 33 is commanded to begin closing from its fully opened state. As the power output continues to increase through the medium-low output power range 70R, 70R' the valve 41 of the second bleed system 33 is commanded to gradually (smoothly or by steps) close until point 69 or point 68 is reached depending whether there is a difference between T1 and T2 or T2=T1.

Where the second predetermined temperature T2 and the first predetermined temperature T1 are set with the difference as described above, the power output line 63 is followed and on reaching point 69 the valve 41 is fully closed. The temperature of the combustor 16 increases from the second predetermined temperature T2 to the first predetermined temperature T1, over the short power output range 74R. When the first predetermined temperature T1 is reached the valve 40 is commanded to begin closing from its fully opened or maximum allowable opened state.

Alternatively, where the second predetermined temperature T2 and the first predetermined temperature T1 are set to be approximately equal as described above, the power output line 63' is followed and on reaching point 68 the valve 41 is fully closed. The valve position sensor that monitors valve 41 signals that valve 41 is fully closed or very nearly closed, say within 5% closed, and the engine control unit 42 commands the valve 40 to begin closing.

In either circumstance, as the power output continues to increase through the medium-high output power range 67R the valve 40 of the first bleed system 32 is commanded to gradually (smoothly or by steps) close until point 66.

As described above the predetermined temperatures T1 and T2 are maintained at a constant nominal temperature through the medium-low output power range 70R, 70R' and medium-high output power range 67R by virtue of the temperature sensor 44 indicating when an upper or lower limit is reached and modulating the valves to open or close an amount to compensate such that the combustor temperature remains within the predetermined temperature band.

As will be apparent from the description relating to decreasing power output, during the high output power range 65R both valves 40, 41 are fully closed.

It should be appreciated that the values of the output power ranges 65R, 67R, 70R, 72R and 74R or demanded load at points on the operational lines 63, 63' may be different for different gas turbine engines. Thus although their maximum ranges might appear to overlap, for any one gas turbine engine the output power ranges do not overlap. Therefore, the second bleed system 32 is not operable within the medium-high output power range 67R. In other words, when decreasing engine the second bleed system 33 only commences bleeding once the first bleed system 32 has reached its maximum or very close to its maximum, e.g. within 5% of its maximum.

The output power ranges are relative to one another such that in descending order of power outputs the ranges are: high output power range, medium-high output power range, medium-low output power range and low output power range. Thus for any one gas turbine engine the output power ranges do not overlap or may be sequential.

In certain circumstances, particularly where the ambient temperature is extremely low, it is necessary to heat the air in the inlet 12 and/or heat the inlet 12 for anti-icing purposes. In this circumstance the first compressor bleed system 32 may have further ducting to the inlet 12 and a portion of the compressor bleed is used for heating or anti-icing purposes. The remaining compressor bleed, which is the greater portion of the total available compressor bleed, is used by the first compressor bleed system 32 and the second compressor bleed system 34 as described herein.

The present invention is described with reference to the above exemplary turbine engine having a single shaft or spool connecting a single, multi-stage compressor and a single, one or more stage turbine. However, it should be appreciated that the present invention is equally applicable to two or three shaft engines and which can be used for industrial, aero or marine applications.

The terms upstream and downstream refer to the flow direction of the airflow and/or working gas flow through the engine unless otherwise stated. The terms forward and rearward refer to the general flow of gas through the engine. The terms axial, radial and circumferential are made with reference to the rotational axis 20 of the engine.

The invention claimed is:

1. A method of controlling a gas turbine engine, the gas turbine engine having in axial flow series a compressor, a combustor, a compressor-turbine and an exhaust, the gas turbine capable of operating in a series of descending or ascending power output ranges comprising at least a high output power range, a medium-high output power range, a medium-low output power range and a low output power range, the method comprising:
    during the high output power range, bleeding a gas from a most downstream part of the compressor to an upstream part of the compressor is at a minimum or zero and bleeding the gas from the most downstream part of the compressor to the exhaust is at a minimum or zero,
    during the medium-high output power range, bleeding the gas from the most downstream part of the compressor to the upstream part of the compressor so that a first predetermined temperature of the combustor is maintained, and bleeding the gas from the most downstream part of the compressor to the exhaust is at a minimum or zero,
    during the medium-low output power range, bleeding the gas from the most downstream part of the compressor to the upstream part of the compressor and bleeding the gas from the most downstream part of the compressor to the exhaust so that a second predetermined temperature of the combustor is maintained, wherein the high output power range, the medium-high output power range, the medium-low output power range and the low output power range do not overlap with one another.

2. The method of controlling the gas turbine engine as claimed in claim 1, wherein, during the low output power range bleeding the gas from the most downstream part of the compressor to the upstream part of the compressor is at a maximum and bleeding the gas from the most downstream part of the compressor to the exhaust is at a maximum.

3. The method of controlling the gas turbine engine as claimed in claim 1, wherein, during the medium-low output power range, bleeding the gas from the most downstream part of the compressor to the upstream part of the compressor is at a maximum.

4. The method of controlling the gas turbine engine as claimed in claim 1, wherein, the medium-high output power range has a maximum point and a minimum point and bleeding the gas from the most downstream part of the compressor to the upstream part of the compressor comprises changing the amount of gas bled from a minimum amount at the maximum point to a maximum amount at the minimum point.

5. The method of controlling the gas turbine engine as claimed in claim 1, wherein, the medium-low output power range has a maximum point and a minimum point and bleeding the gas from the most downstream part of the compressor to the exhaust comprises changing the amount of gas bled from a minimum amount at the maximum point to a maximum amount at the minimum point.

6. The method of controlling the gas turbine engine as claimed in claim 1, wherein, each of the first and second predetermined temperatures comprises a respective nominal temperature and respective upper and lower limits, and
    changing the amount of gas bled comprises increasing the amount of gas bled if the temperature of the combustor reaches the lower limit of either the first predetermined temperature or the second predetermined temperature or decreasing the amount of gas bled if the temperature of the combustor reaches the upper limit of either the first predetermined temperature or the second predetermined temperature.

7. The method of controlling the gas turbine engine as claimed in claim 6, wherein the respective upper and lower limits have respective variances from the respective nominal temperature of +5° C. and −5° C. respectively.

8. The method of controlling the gas turbine engine as claimed in claim 1, wherein, the difference between the first predetermined temperature and the second predetermined temperature is in the range from 5° C. to 20° C.

9. The method of controlling the gas turbine engine as claimed in claim 8, wherein the difference between the first predetermined temperature and the second predetermined temperature is approximately 10° C.

10. The method of controlling the gas turbine engine as claimed in claim 1, further comprising, detecting whether the bleeding of the gas from the most downstream part of the compressor to the upstream part of the compressor has reached a predetermined point and starting the bleeding of the gas from the most downstream part of the compressor to the exhaust upon the bleeding of the gas from the downstream part of the compressor to the upstream part of the compressor reaching the predetermined point.

11. The method of controlling the gas turbine engine as claimed in claim 10, wherein the step of detecting bleeding the gas from the most downstream part of the compressor to the upstream part of the compressor has reached the predetermined point, which is above 90% of a maximum bleeding value, starting bleeding gas from the most downstream part of the compressor to the exhaust.

12. The method of controlling the gas turbine engine as claimed in claim 11, wherein the predetermined point is above 95% of the maximum bleeding value.

13. The method of controlling the gas turbine engine as claimed in claim 1, wherein, the high output power range is between 100% to 50% maximum output power, wherein the medium-high output power range is between 85% to 40% maximum output power, wherein the medium-low output power range is between 85% to 30% maximum output power, and wherein the low output power range is between 0% and 60% maximum output power.

14. The method of controlling the gas turbine engine as claimed in claim 13, wherein the high output power range is between 100% to 75% maximum output power, wherein the medium-high output power range is between 75% to 50% maximum output power,
    wherein the medium-low output power range is between 60% to 30% maximum output power, and wherein the low output power range is between 0% and 40% maximum output power.

15. The method of controlling the gas turbine engine as claimed in claim 14, wherein the medium-low output power range is between 50% to 35% maximum output power.

16. The method of controlling the gas turbine engine as claimed in claim 14, wherein the low output power range is between 0% and 30% maximum output power.

17. A gas turbine engine capable of operating in a series of descending or ascending power output ranges comprising at least a high output power range, a medium-high output power range, a medium-low output power range and a low output power range, the gas turbine engine comprising:

in axial flow series a compressor, a combustor, a compressor-turbine and an exhaust, a temperature sensor mounted to the gas turbine engine and arranged to sense or calculate the temperature of the combustor, a first compressor bleed system comprising a first duct connecting a most downstream part of the compressor and an upstream part and a first valve located on the duct, a second compressor bleed system comprises a second duct connecting the most downstream part of the compressor and the exhaust and a second valve located on the duct, an engine control unit connected to the temperature sensor, the first valve and the second valve, the engine control unit programmed to control the first valve and the second valve dependent on the temperature of the combustor such that during the high output power range, bleeding a gas from the most downstream part of the compressor to an upstream part of the compressor is at a minimum or zero and bleeding the gas from the most downstream part of the compressor to the exhaust is at a minimum or zero, during the medium-high output power range, the first valve is at least partly open such that a first predetermined temperature of the combustor is maintained, and bleeding the gas from the most downstream part of the compressor to the exhaust is at a minimum or zero, during the medium-low output power range, the second valve is at least partly open and the first valve is fully open such that a second predetermined temperature of the combustor is maintained, wherein the high output power range, the medium-high output power range, the medium-low output power range and the low output power range do not overlap with one another.

18. The gas turbine engine as claimed in claim 17, further comprising: a power turbine located between the turbine and the exhaust, the power turbine is connected to a shaft for driving a load.

19. The gas turbine engine as claimed in claim 17, wherein the upstream part is an inlet of the compressor and the most downstream part is at least an outlet of the compressor, wherein the first compressor bleed system and the second compressor bleed system have a common first bleed outlet or a common array of first bleed outlets located at the outlet of the compressor.

20. The gas turbine engine as claimed in claim 17, wherein the upstream part is an inlet of the compressor and the most downstream part is at least an outlet of the compressor, wherein the first compressor bleed system and the second compressor bleed system have a common second bleed outlet or a common array of first bleed outlets located between the inlet and outlet of the compressor.

* * * * *